(12) United States Patent
Zaal

(10) Patent No.: US 10,889,356 B2
(45) Date of Patent: Jan. 12, 2021

(54) UPENDING DEVICE FOR UPENDING AN ELONGATE SUPPORT STRUCTURE

(71) Applicant: Seaway Heavy Lifting Engineering B.V., Zoetermeer (NL)

(72) Inventor: Bernardus Martinus Zaal, Woerden (NL)

(73) Assignee: Seaway Heavy Lifting Engineering B.V., Zoetermeer (NL)

( * ) Notice: Subject to any disclaimer, the term of this patent is extended or adjusted under 35 U.S.C. 154(b) by 0 days.

(21) Appl. No.: 16/484,107

(22) PCT Filed: Feb. 7, 2018

(86) PCT No.: PCT/EP2018/053108
§ 371 (c)(1),
(2) Date: Aug. 6, 2019

(87) PCT Pub. No.: WO2018/146163
PCT Pub. Date: Aug. 16, 2018

(65) Prior Publication Data
US 2020/0023923 A1 Jan. 23, 2020

(30) Foreign Application Priority Data

Feb. 7, 2017 (NL) ..................................... 2018328

(51) Int. Cl.
*B63B 27/10* (2006.01)
*F03D 13/10* (2016.01)
*B63B 35/00* (2020.01)
(52) U.S. Cl.
CPC ............ *B63B 27/10* (2013.01); *B63B 35/003* (2013.01); *F03D 13/10* (2016.05); *F05B 2230/61* (2013.01); *F05B 2240/95* (2013.01)
(58) Field of Classification Search
CPC combination set(s) only.
See application file for complete search history.

(56) References Cited

U.S. PATENT DOCUMENTS 8,960,116 B2 *  2/2015  van der Velde .......... B63B 1/04
                                                    114/125
9,809,943 B2 * 11/2017  Bonnemaison ......... E02D 27/42
(Continued)

FOREIGN PATENT DOCUMENTS

NL         2 004 144         7/2011
WO    WO-2011108938 A2 *  9/2011  ............. B63B 27/08
(Continued)

OTHER PUBLICATIONS

Beyer, Manfred et al., "New Bauer Flydrill System Drilling Monopiles at Barrow Offshore Wind Farm, UK," Bauer Maschinen GmbH, Oct. 2011.
(Continued)

*Primary Examiner* — Kyle Armstrong
(74) *Attorney, Agent, or Firm* — Levy & Grandinetti

(57) ABSTRACT

An offshore structure has an upending device for upending an elongate suppo structure from a substantially horizontal loading position on a deck of the offshore structure to a substantially vertical launch position outboard of the offshore structure. The upending device has a pivot axis situated near a side of the offshore structure for pivoting the upending device between the loading position and the launch position. A first end of the upending device has a connector member for pivotally connecting to the elongate support structure. The connector member in the launch position is in a position outboard from the side of the offshore structure. A second end of the upending device is attached to a pulling device that is located on the deck of the offshore structure. The upending device is within reach of one or more hoisting means for the elongate support structure.

36 Claims, 11 Drawing Sheets

(56) References Cited

U.S. PATENT DOCUMENTS

2001/0018009 A1\* 8/2001 de Waard ................ B63B 75/00
                                                                      405/195.1
2011/0258829 A1\* 10/2011 Vanderbeke ............ F03D 13/10
                                                                       29/428

FOREIGN PATENT DOCUMENTS

| WO | WO 2015/093950 | 6/2015 | | |
|---|---|---|---|---|
| WO | WO 2016/105193 | 6/2016 | | |
| WO | WO-2019149674 A1 \* | 8/2019 | ............ | B63B 75/00 |

OTHER PUBLICATIONS

Remco Lowenthal et al., "IHC Handling Systems," IHC Merwede, Oct. 16, 2009.

\* cited by examiner

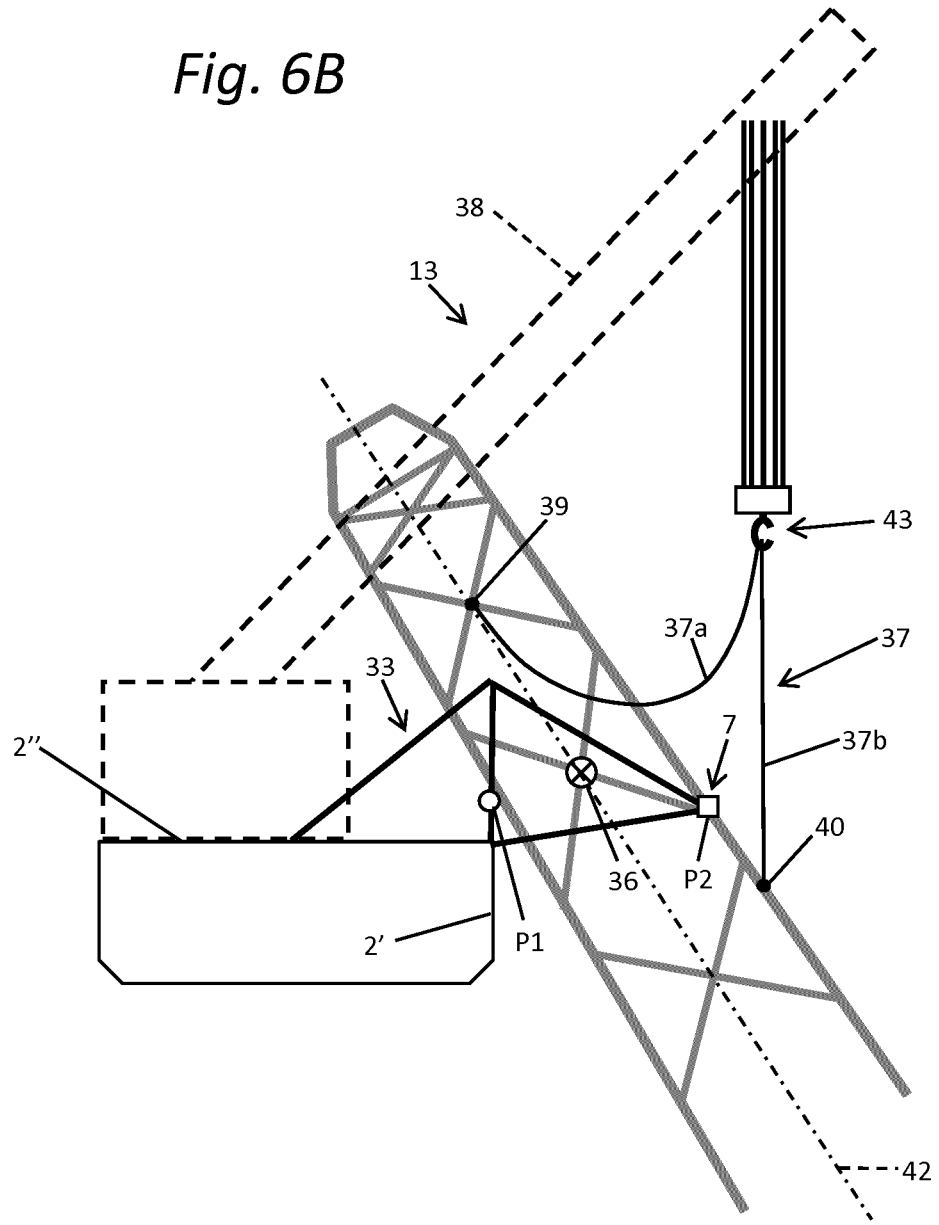

UPENDING DEVICE FOR UPENDING AN ELONGATE SUPPORT STRUCTURE

FIELD OF THE INVENTION

The present invention relates to an offshore structure comprising an upending device for upending or decommissioning an elongate support structure between a substantially horizontal loading position on a deck of the offshore structure, such as a platform or a ship's deck, and a substantially vertical launch position outboard of the offshore structure. The present invention further relates to a method for positioning an elongate support structure, in particular a method for upending or for decommissioning an elongate support structure and to a support structure.

BACKGROUND

Such offshore structures comprising an upending device for upending elongate support structures, in particular foundations for offshore wind turbines, are known from, for instance, WO 2011/108938.

WO 2011/108938 describes a vessel and an outer frame pivotable in relation to the vessel between a substantially horizontal position for transporting the elongated offshore structure to the installation site and a substantially vertical position for installation of the elongated offshore structure at the installation site.

A disadvantage of the vessel of WO 2011/108938 is that it requires a vessel-sized frame. This frame substantially covers the deck of the vessel and during upending of the elongated offshore structure the frame is also upended. The upending of the frame with elongated offshore structure substantially influences the stability of the vessel. Furthermore, due to the instability of the vessel during upending, the pivot axis of the frame is arranged substantially in the middle of the vessel, transversely to the longitudinal direction of the vessel.

WO 2016/105193, NL 2004144, WO 2015/093950 and US 2001/018009 describe systems for upending an elongate structure such as a foundation pile. In each of these arrangements, the structure is secured to an upending device provided on the deck of a vessel, and is upended by pivoting the upending device from a horizontal position to a vertical position about the edge of the vessel.

OBJECT OF THE INVENTION

An object of the invention is to provide an offshore structure for upending or for decommissioning an elongate support structure in a stable manner. It is a further object of to provide an offshore structure with a relatively compact upending device.

SUMMARY OF THE INVENTION

Hereto, according to the invention, an offshore structure has an upending device comprising a pivot axis situated near a side of the offshore structure for pivoting the upending device between the loading position and the launch position, a first end of the upending device having a connector member for pivotally connecting to the elongate support structure, wherein the connector member in the launch position is outboard from the side of the offshore structure, and a second end of the upending device being attached to a pulling device that is located on of the offshore structure. The upending device is within reach of one or more hoisting means for lifting the elongate support structure. The one or more hoisting means may be configured as a crane.

The invention allows an inherently stable upending on the offshore structure. The forces on the hoisting means during upending remain limited by displacement of the pivot connection of the connector member towards a lower position alongside the offshore structure. The centre of gravity (CoG) of the elongated structure can be kept relatively close to the offshore structure. As the CoG does not pass the connector member, no tie back system is required during upending of the elongate support structure. During upending of the elongate support structure the system is statically determinate.

The omission of a tie back system results in a larger available space on the deck, allowing accommodation of equipment or other elongate support structures. Furthermore, the upending of the elongate support structure can be performed with compacter hoisting means, in particular cranes with a lower crane height.

An embodiment of the offshore structure according to the invention has the upending device comprising a carrier arm with a pivot end connected to the pivot axis situated near the side of the offshore structure, and a free end having the connector member, the carrier arm and in the loading position extending from the pivot axis to a position outboard from the side of the offshore structure, in the launch position extending from the pivot axis to a position outboard from the side of the offshore structure. A lever arm is with a first end connected to the pivot end of the carrier arm and extends transversely thereto. A second end of the lever arm is attached to a pulling device that is attached to a deck of the offshore structure. In a upended position, the carrier arm may extend from the pivot axis in a downward direction. The embodiment comprising a carrier arm and a lever arm allows the upending of the support structure with a relatively compact upending device.

According to a further embodiment, in the loading position, the carrier arm extends substantially vertically and the lever arm extends generally along the deck of the offshore structure. The substantially vertical shape of the carrier arm allows for connecting the connector member of the carrier arm to the elongate support structure at a vertical position spaced from the deck of the offshore structure, as such the support structure can be pivoted around the pivot axis to an outboard position.

The term 'onboard position' refers to any position situated or positioned inside, on, or above the hull of the offshore structure. The term 'outboard position' refers to any non-onboard position that is situated or positioned outside the hull of the offshore structure. According to a preferred embodiment, the lever arm in the loading position is supported near the pivot axis, on a vertical distance member to be spaced from the deck. Advantageously, the upending device is additionally supported on the distance member during the loading of the elongate support structure.

In another embodiment, a winch is situated near the pivot end of the carrier arm, a cable passing from a first sheave at the second end of the carrier arm to a second sheave on a deck position, which second sheave in the launch position is situated near the first sheave at the second end of the carrier arm, the cable passing from the second sheave to the winch. The winch allows for controlled upending of the elongate support structure by winding in a synchronised manner with the hoisting means.

In yet another embodiment, the carrier arm and the winch are placed on a transport unit which is displaceable along the side of the offshore structure. As the upending device is transportable along the side of the offshore structure, the position of the upended elongated structure can be easily adjusted and accurately controlled.

In a preferred embodiment, comprising a pair of upending devices separated at a mutual distance, at least one of the upending devices is displaceable along the side of the offshore structure. By supporting the elongated structure on each of its sides by a respective upending device, structures of varying dimensions may be placed between the devices and may be handled in a stable manner.

Moreover, the present invention relates to a method for upending an elongate support structure comprising the steps of:
  providing the support structure in a substantially horizontal position on a deck of an offshore structure;
  connecting a top end of the support structure to a crane;
  connecting the support structure, to a pivoting connector at a free end of a carrier arm, the carrier arm being with a pivot end, pivotally connected near a side of the offshore structure, to be pivoted along a pivot axis that extends along a side of the offshore structure; and
  lifting the top end of the support structure upward while pivoting the carrier arm outboard from the offshore structure around the pivot axis, until the support structure is in a substantially vertical position and the carrier arm extends in a substantially horizontal or downward direction.

Moreover, the present invention relates to a method for decommissioning, in particular down-ending, an elongate support structure. The term 'down-ending' refers to the reverse movement, compared to upending, of the elongate support structure, wherein the support structure is positioned to a substantially horizontal position.

The method comprising the steps of:
  providing the support structure in a substantially vertical position outboard of an offshore structure;
  connecting a top end of the support structure to a crane;
  connecting the support structure, to a pivoting connector at a free end of a carrier arm, the carrier arm being with a pivot end, pivotally connected near a side of the offshore structure, to be pivoted along a pivot axis that extends along a side of the offshore structure; and
  hoisting the top end of the support structure while pivoting the carrier arm onboard the offshore structure around the pivot axis, until the support structure is in a substantially horizontal position and the carrier arm extends in a substantially vertical direction.

BRIEF DESCRIPTION OF DRAWINGS

The invention will be explained in more detail below with reference to drawings in which illustrative embodiments are shown. They are intended exclusively for illustrative purposes and not to restrict the inventive concept, which is defined by the appended claims.

FIGS. 6a-6c show multiple steps of the method for upending a support structure according to a third embodiment of the invention, i.e. in the loading position, the launch position and the upended position.

DETAILED DESCRIPTION OF EMBODIMENTS

Figure 1:
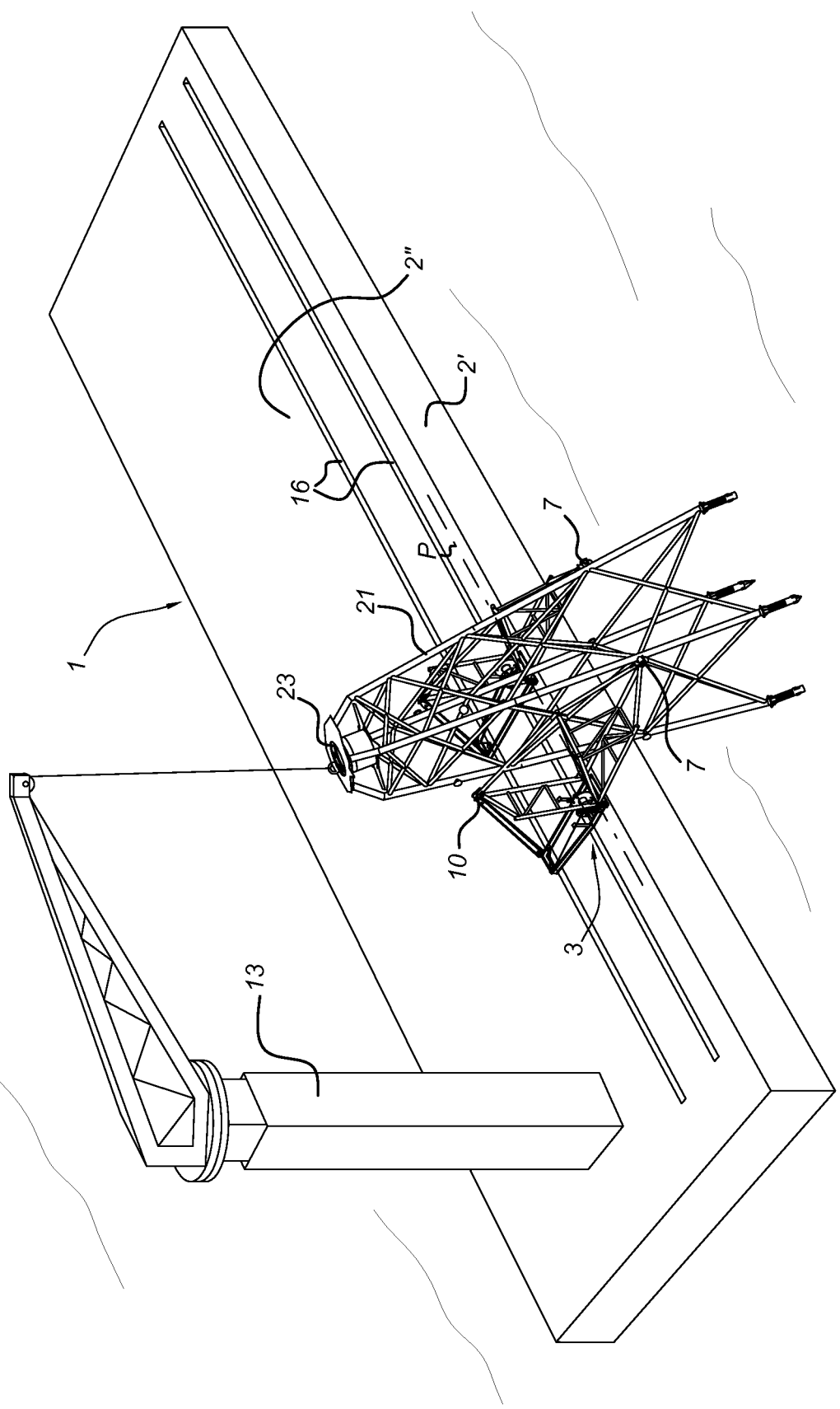
FIG. 1 shows a schematic perspective view of an offshore structure according to the invention during upending of a wind turbine foundation.

FIG. 1 shows an offshore structure 1, in particular a vessel, with a side 2' and a deck 2" during upending of a wind turbine foundation 21, in particular a jacket 21a (shown in FIGS. 4A-4D), from a horizontal loading position on the deck 2" of the vessel 1 to a vertical launch position outboard of the vessel 1. The jacket 21 is on both sides pivotally connected to a connector member 7 of an upending device 3. Preferably, both upending devices 3 are displaceable along the side 2' of the vessel 1, in particular the upending devices 3 can be provided with wheels (not shown) to roll on a track 16 provided on the deck 2" of the vessel 1. During upending a crane 13 pivots the jacket 21 to the vertical position by guiding a top end 23 of the jacket 21 from an onboard to an outboard position. Alternatively, the crane 13 can pivot the jacket 21 to the vertical position by guiding a bottom end of the jacket 21.

Figure 2:
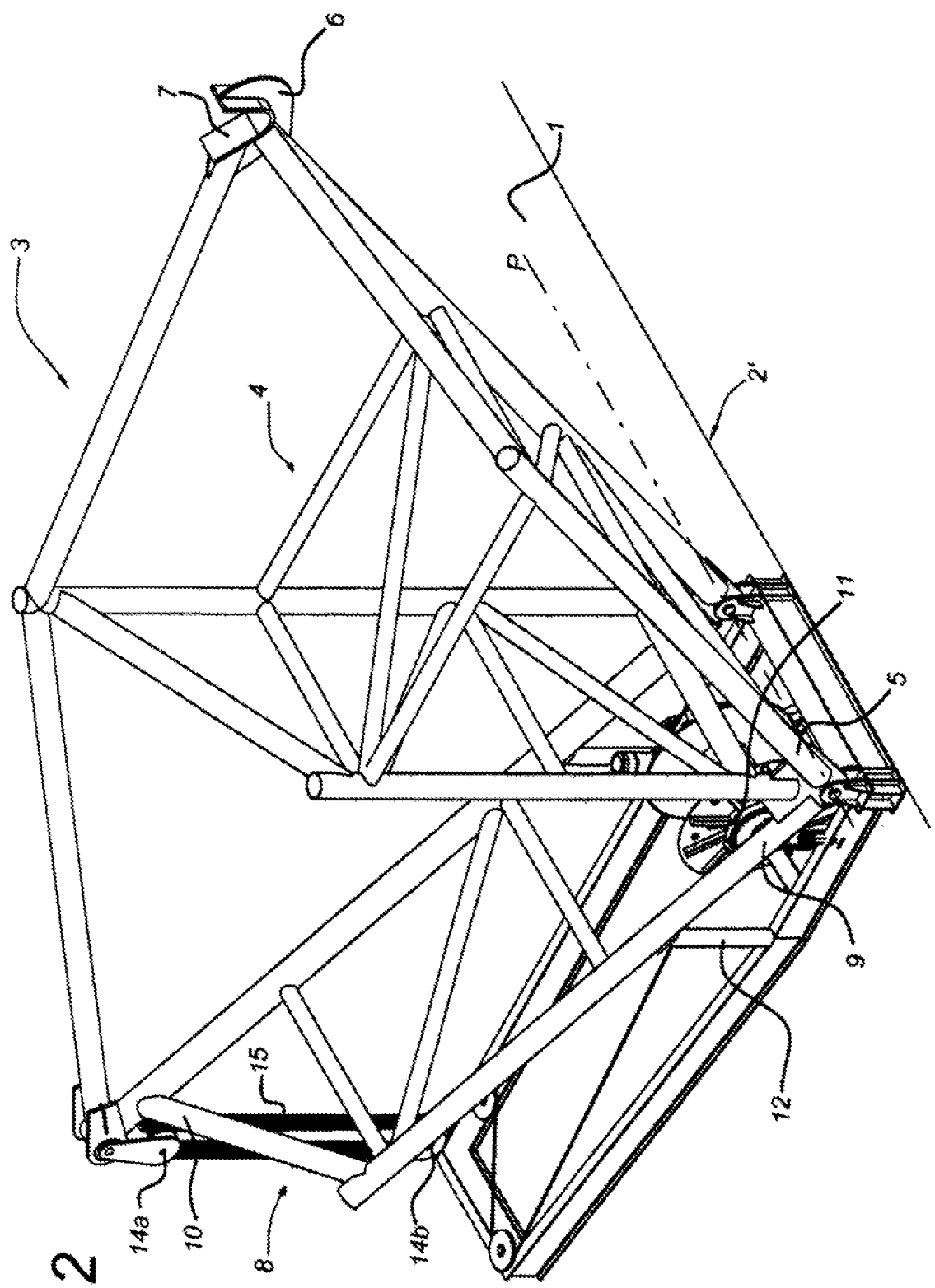
FIG. 2 shows a schematic perspective view of an upending device according to the invention.

FIG. 2 shows the upending device 3 provided near the side 2' of the vessel 1 of FIG. 1 in a loading position. The upending device 3 has a pivot axis P situated near the side 2' of the vessel 1 for pivoting the upending device 3 between the loading position and the launch position.

The upending device 3 has a carrier arm 4 with a pivot end 5 connected to be rotatable around the pivot axis P, and a free end 6 having a connector member 7 for pivotally connecting to the foundation 21. The connector member 7 in the launch position is in a position outboard from the side 2' of the vessel 1. In the loading position, the carrier arm 4 extends from the pivot axis P to a first position outboard from the side of the vessel 1. In the launch position the carrier arm 4 extends from the pivot axis P to a second position outboard from the side of the vessel 1. In an upended position, the carrier arm 4 extends from the pivot axis P in a downward direction.

The upending device 3 has a lever arm 8 with a first end 9 connected to the pivot end 5 of the carrier arm 4 and extending transversely thereto, and with a second end 10 that is attached to a pulling device 11 that is located nearby the upending device 3.

The pulling device 11 is configured as a winch situated near the pivot end 5 of the carrier arm 4, alternatively the winch can be situated at a distance from the upending device 3. A cable 15 passes from a first sheave 14a at the second end 10 of the lever arm 8 to a second sheave 14b on a deck position, which second sheave 14b that in the loading position is situated near the first sheave 14a at the second end 10 of the lever arm 8. The cable 15 further passes from the second sheave 14b to the winch 11.

Furthermore, near the pivot axis P, the lever arm 8 is supported by a vertical distance member 12 in the loading position.

The carrier arm 4, the lever arm 8 and the winch 11 may be placed on a transport unit 16 which is displaceable along the side 2' of the vessel 1.

Figure 3:
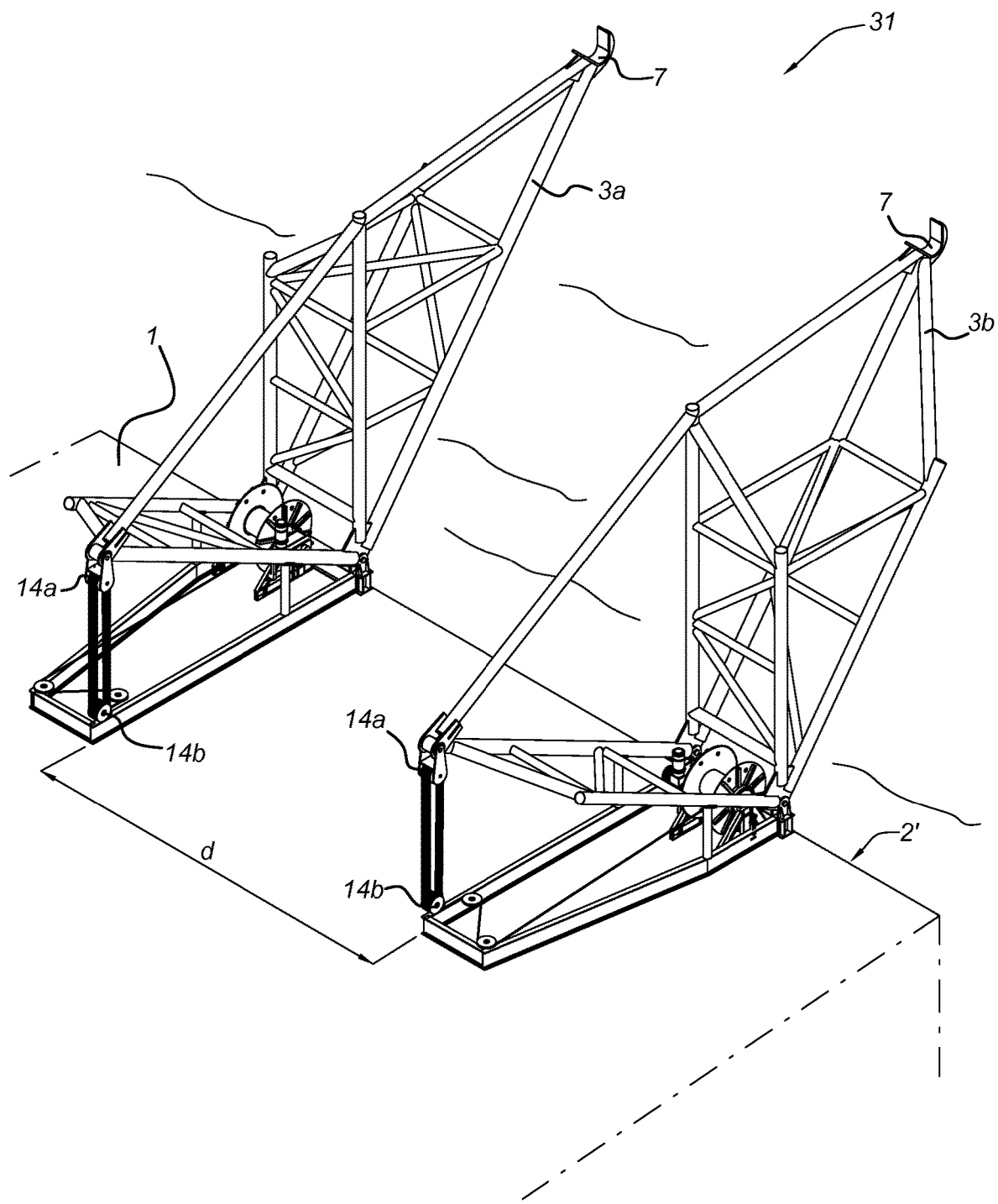
FIG. 3 shows a perspective view of an upending assembly according to the invention with two devices of the type shown in FIG. 2.

FIG. 3 shows an assembly 31 of two upending devices 3a, 3b of FIG. 2 spaced apart with a mutual distance d near the side 2' of the vessel 1. At least a first upending device 3a is displaceable along the side 2' of the vessel 1.

Figure 4A:
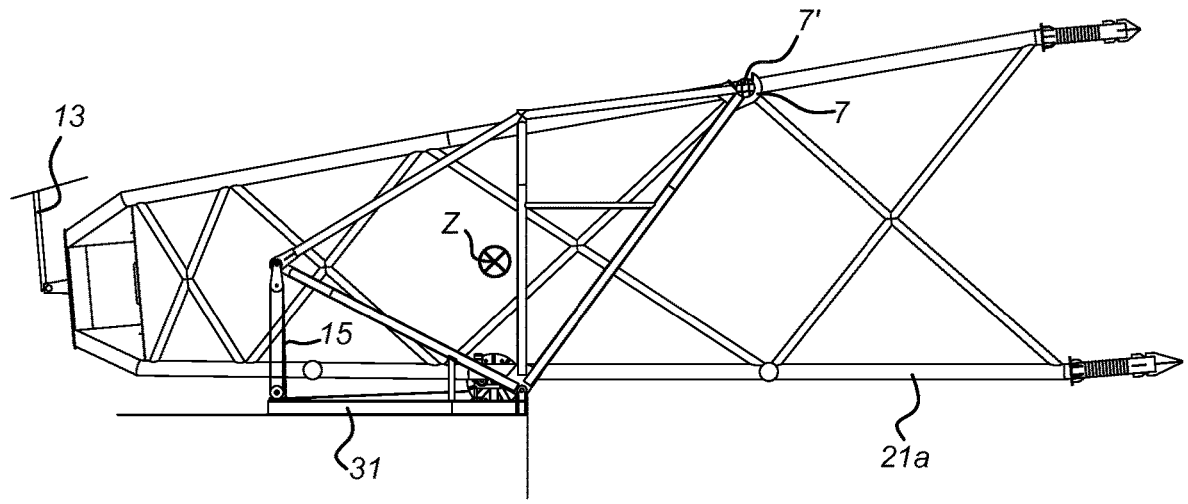
FIGS. 4a-d show multiple steps of the method for upending a support structure according to a first embodiment of the invention, i.e. in the loading position, the launch position and the upended position.
Figure 4B:
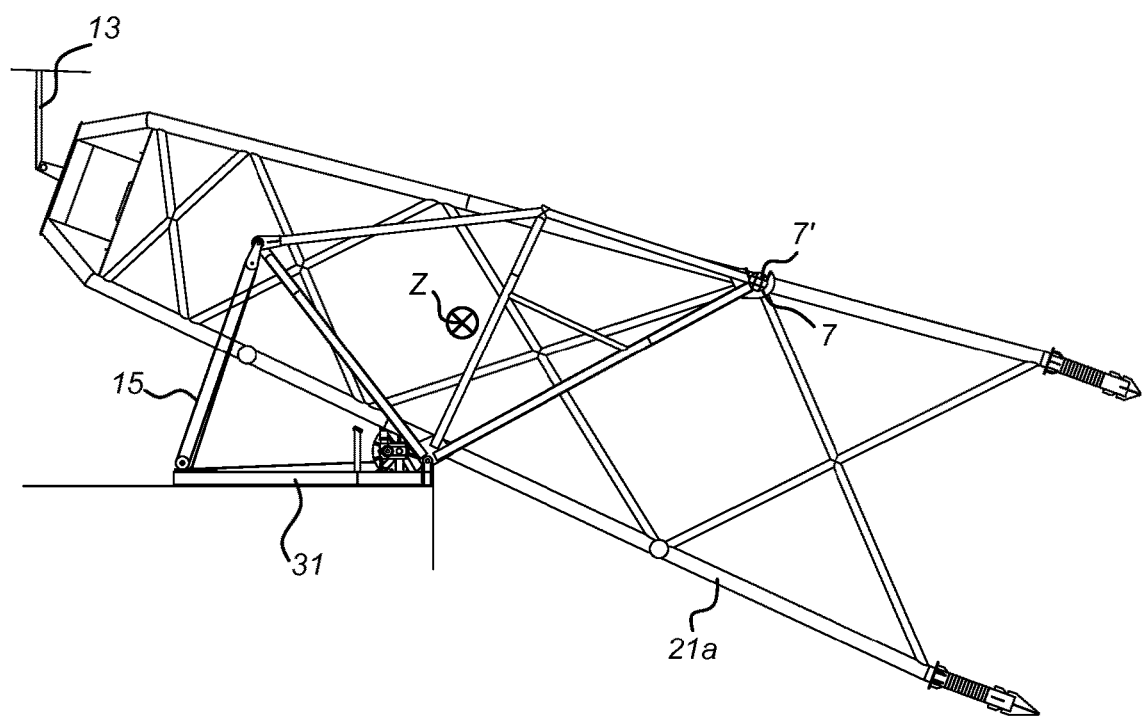
Figure 4C:
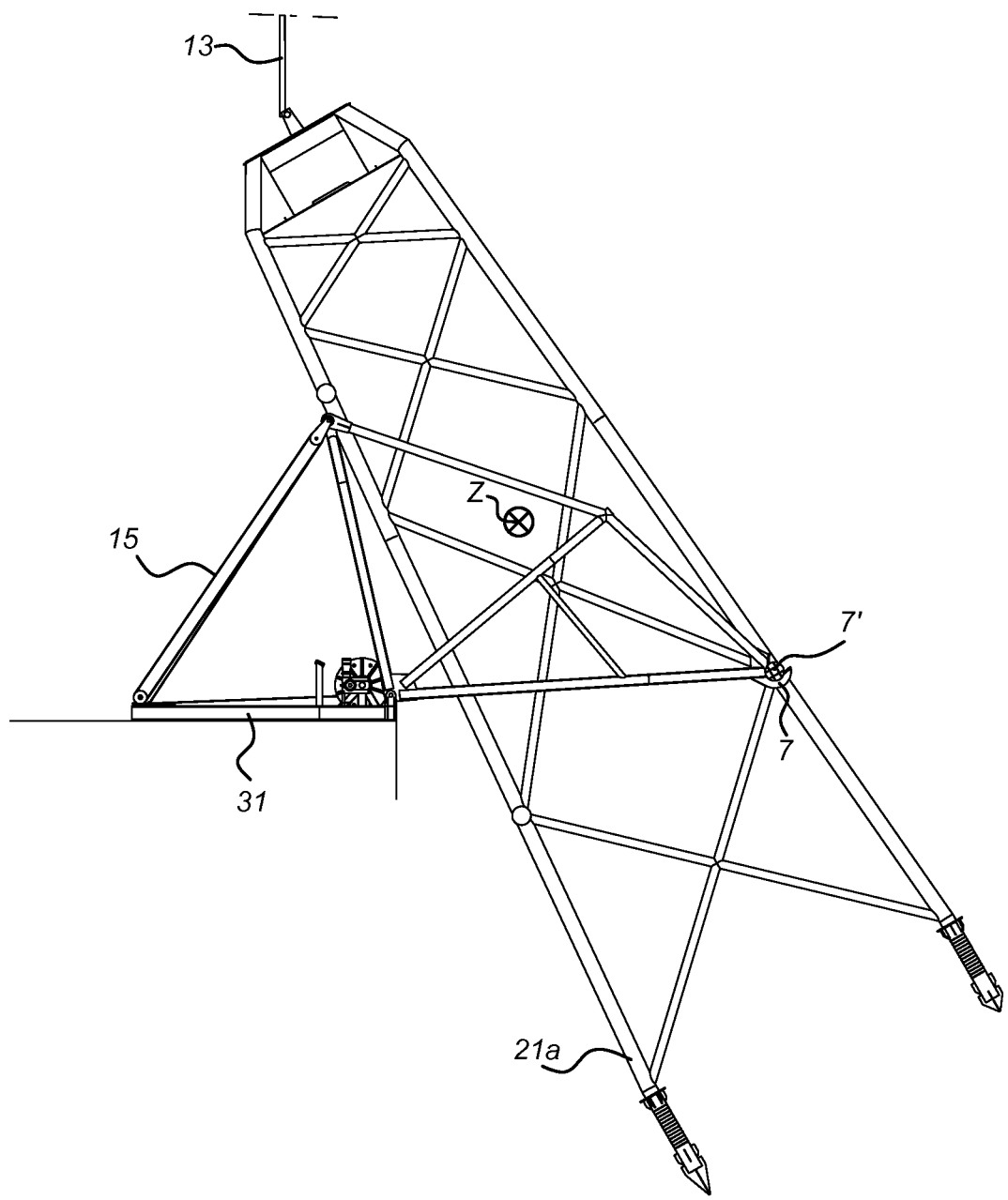
Figure 4D:
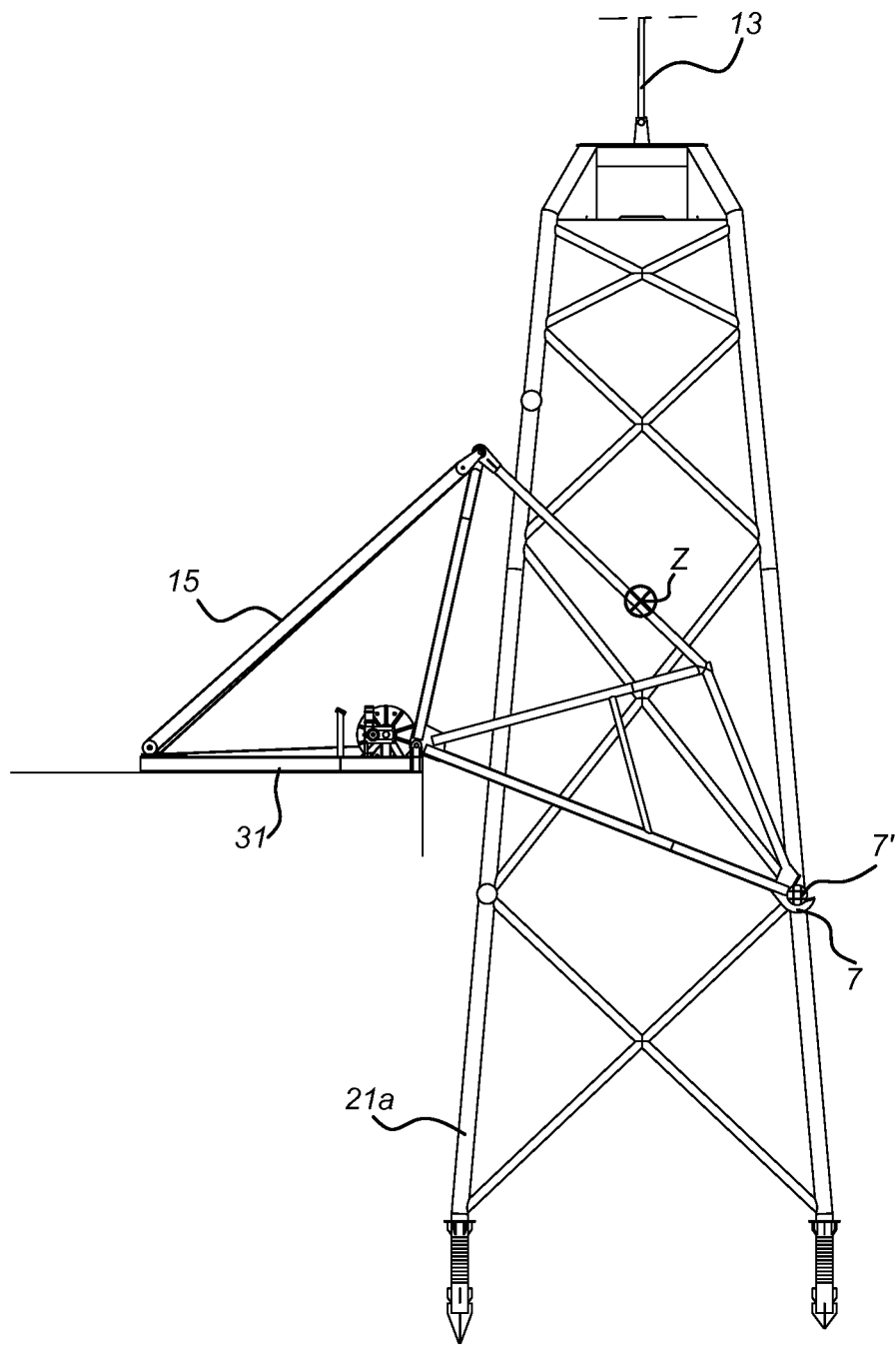

FIGS. 4a-4d show the steps of a first embodiment of a method for upending the wind turbine foundation 21, configured as a jacket 21a with a centre of gravity z, pivotally connected to the assembly 31 of FIG. 3 from a loading position in FIG. 4a to a upended position in FIG. 4d.

In a first step of the method, the jacket 21a is provided in the loading position (see FIG. 4a), in which the jacket 21a is positioned parallel to the deck 2" of the vessel 1 and the crane 13 is attached to a top end 23 of the jacket 21a. Each upending device 3 of the assembly 31 rests on the distance member 12 thereof.

In a second step of the method, the jacket 21a is upended by unwinding each winch 12 of the assembly 31 such that the assembly 31 is pivoted towards the upended position and lifting the top end 23 of the jacket 21a with the crane 13 such that the jacket 21a is kept free from the deck 2". In an intermediate position shown in FIG. 4b, the jacket 21a is positioned under a 30° angle with the deck 2". In the launch position shown in FIG. 4c, the jacket 21a is positioned under a 60° angle with the deck 2" and the carrier arm 4 is positioned parallel to the deck 2" of the vessel 1. In the upended position shown in FIG. 4d, the jacket 21a is positioned under a 90° angle with the deck 2".

In a third step of the method, the jacket 21a is released by lifting the jacket 21a out of the connector members 7 and lowering the jacket 21a towards the sea bed.

Figure 5A:
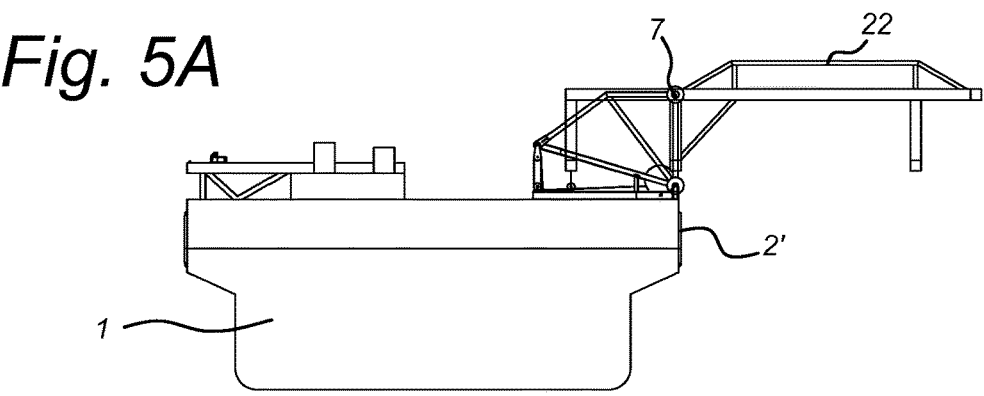
FIGS. 5a-f show multiple steps of the method for upending a support structure according to a second embodiment of the invention, i.e. in the loading position, the launch position and the upended position.
Figure 5B:
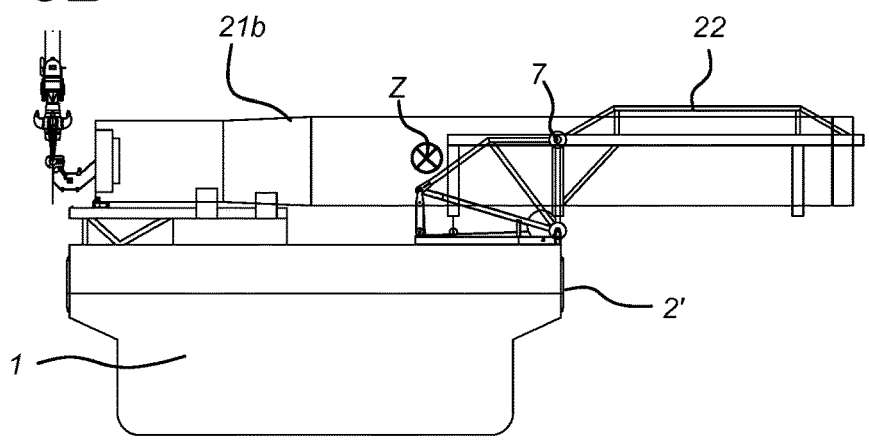
Figure 5C:
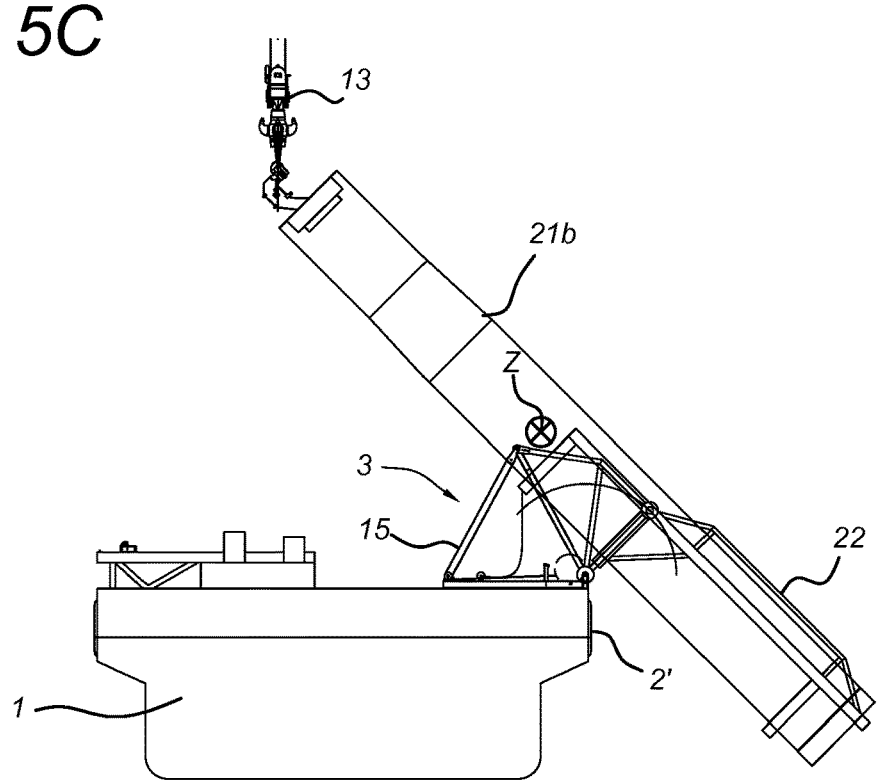
Figure 5D:
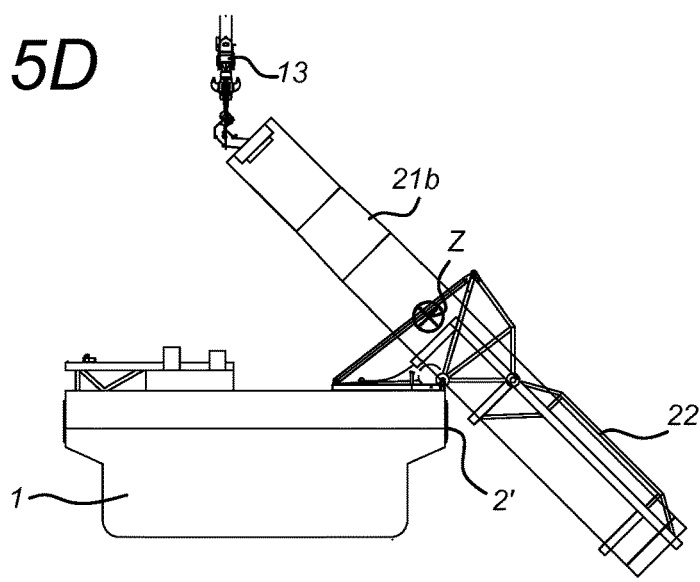
Figure 5E:
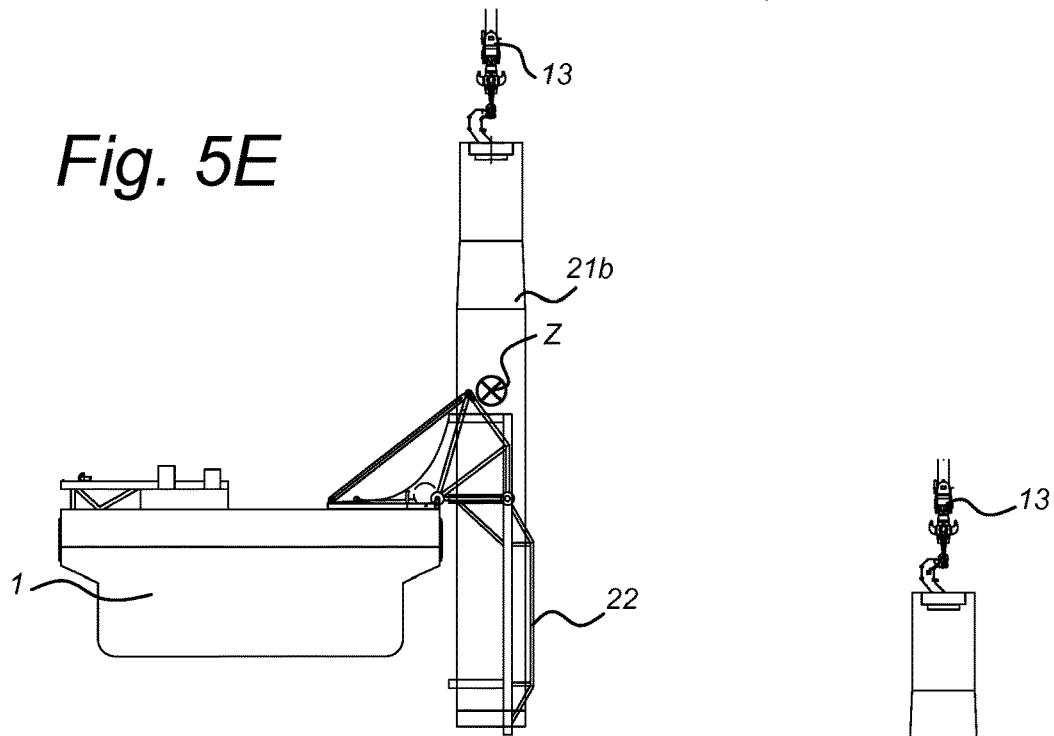
Figure 5F:
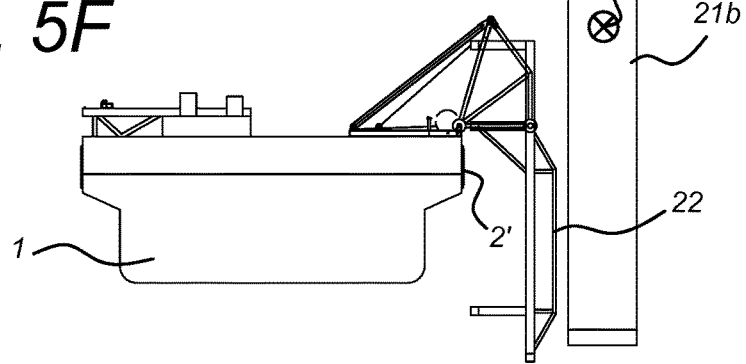

FIGS. 5a-5f show the steps of a second embodiment of a method for upending the wind turbine foundation 21, configured as a monopile 21b with a centre of gravity z, from a loading position in FIG. 5b to a launch position in FIG. 5f using a monopile frame 22.

FIG. 5a shows the offshore structure 1 of FIG. 1, wherein the monopile frame 22 is provided in the connectors members 7 of each upending device 3.

In a first step of the method, the monopile 21b is provided in the monopile frame 22 in the loading position (see FIG. 5b), in which the monopile 21b is positioned parallel to the deck 2" of the vessel 1 and the crane 13 is attached to a top end 23 of the monopile 21b. Each upending device 3 of the assembly 31 rests on the distance member 12 thereof. In a second step of the method, the top end 23 of the monopile 21b with the crane 13 is lifted till the monopile 21b is positioned under a 45° angle with the deck 2" (see FIG. 5c). In a third step of the method, the monopile 21b is upended by unwinding each winch 12 of the assembly 13 such that the assembly 31 is pivoted towards the upended position (see FIG. 5d). In a fourth step of the method, the top end 23 of the monopile 21b with the crane 13 is lifted above an outboard position till the monopile 21b is positioned under a 90° angle with the deck 2" (see FIG. 5e).

In a fifth step of the method, the monopile 21b is released by lifting the monopile 21b out of the monopile frame 22 and lowering the monopile 21b towards the sea bed. FIG. 5f shows the monopile 21b released from the monopile frame 22.

Figure 6A:
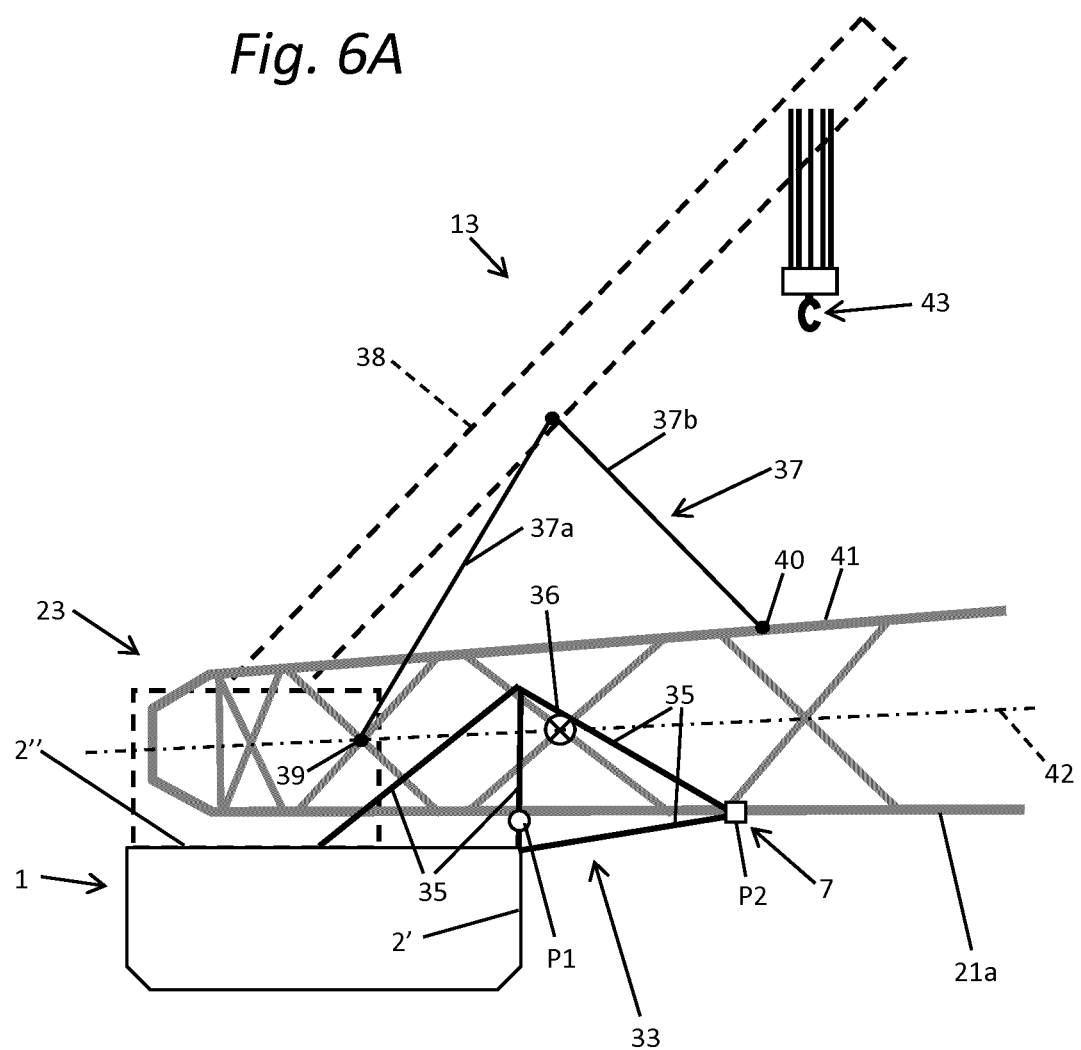
Figure 6C:
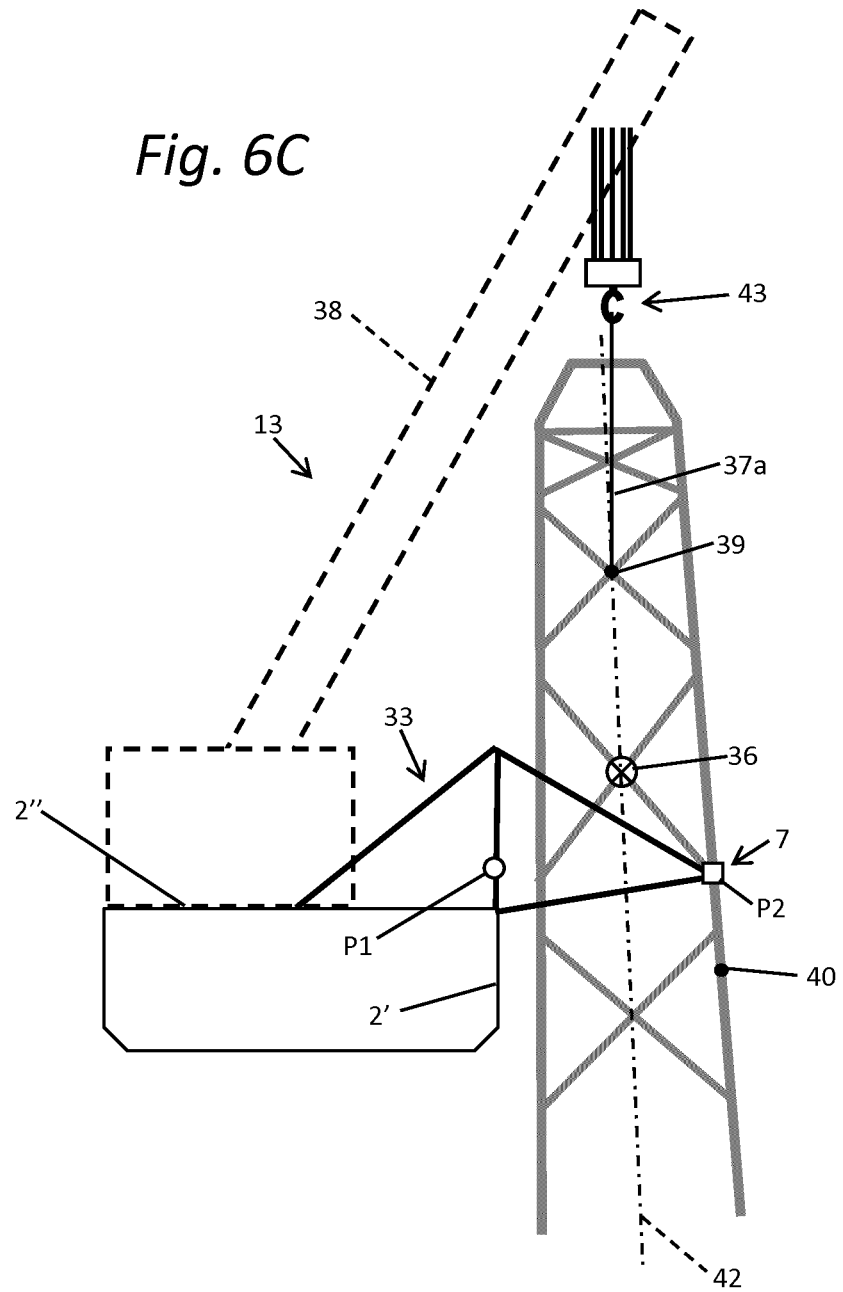

FIGS. 6a to 6c show a variant of the invention, in which an upending frame 33 guides a wind turbine foundation 21 configured as a jacket 21a. Note that features of this embodiment that are in common with the previously described embodiments are indicated using like reference numerals.

During the upending method of this variant, the jacket 21a is upended from a loading position (shown in FIG. 6a) through a launch position (shown in FIG. 6b) to an upended position (shown in FIG. 6c), after which the jacket 21a is released from the upending frame 33 and lowered toward the seabed. In contrast with the upending device 3 of the preceding embodiments, the upending frame 33 does not pivot during upending, but remains fixed with respect to the deck 2" throughout the upending process.

The upending frame 33 projects outboard from the side 2' of the vessel 1 in use. The upending frame 33 is formed by a plurality of frame members 35, one of which supports a first pivot P1 that defines a first pivot axis about which the jacket 21a pivots during a step of the upending process. The upending frame 33 further includes a connector member 7 for pivotally connecting to the jacket 21a. The connector member 7 provides a second pivot P2 that defines a second pivot axis about which the jacket 21a pivots during a subsequent step of the upending process. When the upending frame 33 is installed for use as shown in FIGS. 6a to 6c, the first pivot P1 is located above, and its first pivot axis extends substantially parallel to, the side 2' of the vessel 1 about which the jacket 21a is to be upended. The second pivot P2 defined by connector member 7 is positioned outboard of the side 2' of the vessel 1 and its second pivot axis is parallel to the first pivot axis defined by the first pivot P1.

The method of upending the jacket 21a using the upending frame 33 of this embodiment will now be described with reference to FIGS. 6a to 6c.

Referring first to FIG. 6a, in a first step of the variant method the jacket 21a is disposed in the loading position, in which the jacket 21a is substantially parallel to the deck 2" and sits between two upending frames 33 as in preceding embodiments. In this position, the jacket 21a rests on the first pivot P1 of each upending frame 33 and the jacket 21a is positioned with its centre of gravity 36 outboard of the side 2' of the vessel 1. At this stage, the jacket 21a is not engaged with the connector members 7 of the upending frames 33, but is supported by the crane 13 to prevent the jacket 21a from upending before it is intended.

The crane 13 is connected to the jacket 21a at two positions along the length of the jacket 21a by means of rigging 37 suspended from a boom 38 of the crane 13. The rigging 37 includes an upper rigging portion 37a and a lower rigging portion 37b. The upper rigging portion 37a attaches to the jacket 21a at an upper attachment point 39 disposed on a cross brace of jacket 21a. The lower rigging portion 37b attaches to the jacket 21a at a lower attachment point 40 disposed on a leg 41 of the jacket 21a. The upper attachment point 39 is positioned on a central longitudinal axis 42 of the jacket 21a and the lower attachment point 40 is laterally offset from the central longitudinal axis 42. The upper attachment point 39 is positioned nearer to the top end 23 of the jacket 21a than the lower attachment point 40. Specifically, the upper attachment point 39 is positioned inboard of the side 2' of the vessel 1 and the lower attachment point 40 is positioned outboard of the side 2' of the vessel 1.

Referring now to FIG. 6b, this shows the jacket 21a in the partially-upended launch position. To bring the jacket 21a from the loading position shown in FIG. 6a to the launch position, the rigging 37 is transferred from its initial suspension point along the boom 38 of the crane 13 to be suspended from a hook 43 of the crane 13. The rigging 37 remains attached to the jacket 21a at upper and lower attachment points 39, 40. The crane 13 now supports the load of the jacket 21a via the lower attachment point 40 only, which is positioned below the crane hook 43. The upper rigging 37a is now slack between the upper attachment point 39 and the crane 13 and the lower rigging 37b is taut between the lower attachment point 40 and the crane 13. The jacket 21a is allowed to pivot under its own weight about first pivot P1 until the leg 41 of the jacket 21a on which the lower attachment point 40 is disposed reaches and engages with the connector members 7 of the upending frames 33.

Referring now to FIG. 6c, in a next step of the variant method the lower rigging portion 37b is detached from the jacket 21a at lower attachment point 40, but the upper rigging portion 37a remains attached to the upper attachment point 39. The crane boom 38 is pivoted so as to bring the crane hook 43 upwards and inboard towards the side 2' of the vessel 1. At the same time, the jacket 21a is pivoted in the connector members 7 about the second pivot P2 by virtue of tension in the upper rigging portion 37a and is lifted clear of the first pivot P1 by the crane 13. The jacket 21a approaches the upended position as shown in FIG. 6c, in which the crane hook 43 is positioned above the upper attachment point 39.

In a final step of the variant method, the upended jacket 21a is released from the upending frames 33 by lifting the jacket 21a out of the connector members 7 and lowering the jacket 21a beneath the surface.

It will be apparent to the skilled reader that the above steps may be reversed to bring a jacket 21a onboard the vessel 1 upon decommissioning.

Other alternatives and equivalent embodiments of the present invention are conceivable within the idea of the invention, as will be clear to the person skilled in the art. The scope of the invention is limited only by the appended claims.

The invention claimed is:

1. An offshore structure comprising:
   an upending device for upending or decommissioning an elongate support structure from/to a substantially horizontal first position on a deck of the offshore structure to/from a substantially vertical second position outboard of the offshore structure,
   said upending device comprising:
   a pivot axis situated to a side of the offshore structure for pivoting the upending device between the first position and the second position;
   a first end of the upending device having a connector member that pivotally connects to the elongate support structure;
   a second end of the upending device being attached to a pulling device that is located on the offshore structure;
   a carrier arm with a pivot end connected to the pivot axis, and a free end comprising the connector member, the carrier arm extending from the pivot axis to its free end, such that the free end of the carrier arm and the connector member are both outboard from the side of the offshore structure in the first and second positions; and
   a lever arm with a first end and a free end, the first end of the lever arm being connected to the pivot end of the carrier arm, and the second end of the upending device being formed by the free end of the lever arm,
   wherein in the first position, the carrier arm extends generally upwardly from its pivot end to its free end, and the free end of the lever arm is inboard relative to the first end of the lever arm,
   the upending device being within reach of one or more hoisting means for lifting the elongate support structure.

2. The offshore structure according to claim 1, wherein the one or more hoisting means are configured as a crane.

3. The offshore structure according to claim 1, wherein in the second position the carrier arm extends from the pivot axis in a downward direction.

4. The offshore structure according to claim 1, wherein in the first position, the carrier arm extends substantially vertically and the lever arm extends generally along the deck of the offshore structure.

5. The offshore structure according to claim 1 the lever arm in the first position being supported at the pivot axis, on a vertical distance member so as to be spaced from the deck.

6. The offshore structure according to claim 1, wherein the pulling device is configured as a winch situated at the pivot end of the carrier arm, a cable passing from a first sheave at the second end of the lever arm to a second sheave on a deck position, which second sheave in the second position is situated at the first sheave at the second end of the lever arm, the cable passing from the second sheave to the winch.

7. The offshore structure according to claim 6, wherein the carrier arm, the lever arm and the winch are placed on a transport unit which is displaceable along the side of the offshore structure.

8. The offshore structure according to claim 1, comprising a pair of upending devices separated at a mutual distance, at least one of the upending devices being displaceable along the side of the offshore structure.

9. The offshore structure according to claim 1, wherein the free end of the lever arm is outboard of the side of the offshore structure in the second position of the upending device.

10. The offshore structure according to claim 1, wherein the lever arm extends generally upwardly from its first end to its free end in the second position of the upending device.

11. The offshore structure according to claim 1, wherein the free end of the lever arm is at a level above the first end of the lever arm in the first position of the upending device.

12. The offshore structure according to claim 1, wherein the lever arm extends generally transversely with respect to the carrier arm.

13. The offshore structure according to claim 1, wherein the connector member is at a level below the pivot axis in the second position of the upending device.

14. The offshore structure according to claim 1, wherein the free end of the carrier arm is outboard of the pivot end of the carrier arm in the first and second positions of the upending device.

15. A method for positioning an elongate support structure from/to a substantially vertical position outboard of an offshore structure to/from a substantially horizontal position on a deck of the offshore structure, comprising the steps of:
   providing the support structure;
   connecting a top end of the support structure to a crane;
   connecting the support structure to a pivoting connector at a free end of a carrier arm, the carrier arm being with a pivot end pivotally connected at a side of the offshore structure, to be pivoted along a pivot axis that extends along the side of the offshore structure, wherein the pivot end of the carrier arm is connected to a first end of a lever arm, which with a free end is connected to a winch, wherein when the elongate support structure is in the substantially horizontal position, the carrier arm extends generally upwardly from its pivot end to its free end, and the free end of the lever arm is inboard relative to the first end of the lever arm; and
   moving the top end of the support structure relative to the side of the offshore structure while pivoting the carrier arm around the pivot axis.

16. The method according to claim 15, wherein the step of providing the support structure comprises providing the support structure in a substantially horizontal position on a deck of the offshore structure; and the step of moving the top end of the support structure comprises lifting the top end of the support structure upward while pivoting the carrier arm outboard from the offshore structure around the pivot axis, until the support structure is in a substantially vertical position and the carrier arm extends in a substantially horizontal or downward direction.

17. The method according to claim 16, comprising the step of paying out the winch while lifting the top end of the support structure.

18. The method according to claim 15, wherein the step of providing the support structure comprises providing the support structure in a substantially vertical position outboard from the offshore structure; and the step of moving the top end of the support structure comprises lowering the top end of the support structure relative to the deck of the offshore structure while pivoting the carrier arm onboard the offshore structure around the pivot axis, until the support structure is in a substantially horizontal position and the carrier arm extends in a substantially vertical direction.

19. A method for moving an elongate support structure from/to a substantially horizontal position on a deck of an offshore structure to/from a substantially vertical position outboard of the offshore structure, the method comprising:
pivoting the support structure about a first pivot; and
pivoting the support structure about a second pivot positioned outboard of the first pivot with respect to the offshore structure,
wherein the first and second pivots remain in fixed relation to the offshore structure.

20. The method according to claim 19, comprising connecting the support structure to, or disconnecting the support structure from, a pivoting connector that defines the second pivot.

21. The method according to claim 20, comprising lifting the support structure to connect the support structure to, or to disconnect the support structure from, the pivoting connector.

22. The method according to claim 20, comprising pivoting the pivoting connector about the first pivot.

23. The method according to claim 20, comprising connecting the support structure to the pivoting connector or disconnecting the support structure from the pivoting connector by pivoting the support structure about the first pivot.

24. The method according to claim 19, comprising lifting an end of the support structure, inboard of the first pivot to effect pivotal movement of the support structure about the first pivot.

25. The method according to claim 24, wherein during pivotal movement of the support structure about the first pivot the centre of gravity of the support structure moves from a position inboard of the first pivot to a position outboard of the first pivot.

26. The method according to claim 25, comprising constraining and controlling pivotal movement of the support structure about the first pivot after the centre of gravity of the support structure moves outboard of the first pivot.

27. The method according to claim 19, comprising pivoting the support structure about the second pivot while also pivoting the support structure about the first pivot.

28. The method according to claim 19, comprising moving the support structure toward or away from the first pivot by pivoting the support structure about the second pivot.

29. The method according to claim 19, wherein the centre of gravity of the support structure is outboard of the first pivot when the support structure is in the substantially horizontal position.

30. The method according to claim 19, comprising supporting the support structure, when in the substantially horizontal position, by rigging suspended from a crane on the offshore structure, the rigging comprising upper and lower rigging portions that are connected respectively to upper and lower attachment points on the support structure.

31. The method according to claim 30, wherein when the support structure is in the substantially horizontal position, the upper and lower attachment points are, respectively, inboard and outboard from a side of the offshore structure.

32. The method according to claim 30, comprising transferring the rigging comprising the upper and lower rigging portions from a boom of the crane to a hook of the crane.

33. The method according to claim 30, comprising supporting the support structure in an intermediate launch position by the lower rigging portion acting in tension between the crane and the lower attachment point.

34. The method according to claim 33, wherein when the support structure is in the second position, the upper rigging portion is slack between the crane and the upper attachment point.

35. The method according to claim 30, comprising supporting the support structure in the substantially vertical position by the upper rigging portion acting in tension between the crane and the upper attachment point.

36. The method according to claim 35, comprising disconnecting the lower rigging portion from the lower attachment point and/or from the crane.

* * * * *